No. 620,322. Patented Feb. 28, 1899.
G. P. HOLMES.
HAY AND STOCK RACK FOR VEHICLES.
(Application filed July 19, 1898.)
(No Model.) 2 Sheets—Sheet 2.
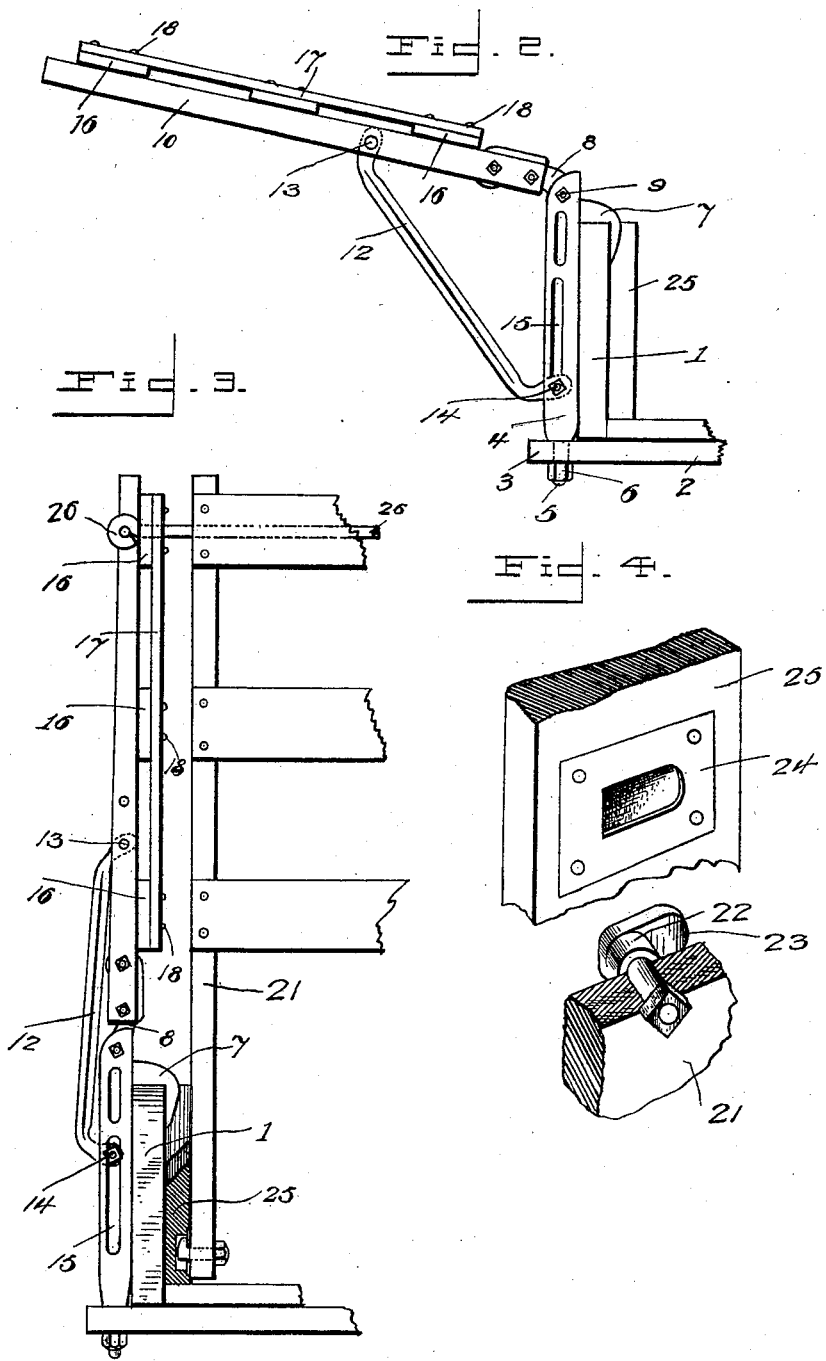
Inventor:
Grant P. Holmes,
by H. B. Willson & Co.
Attorneys.
Witnesses:

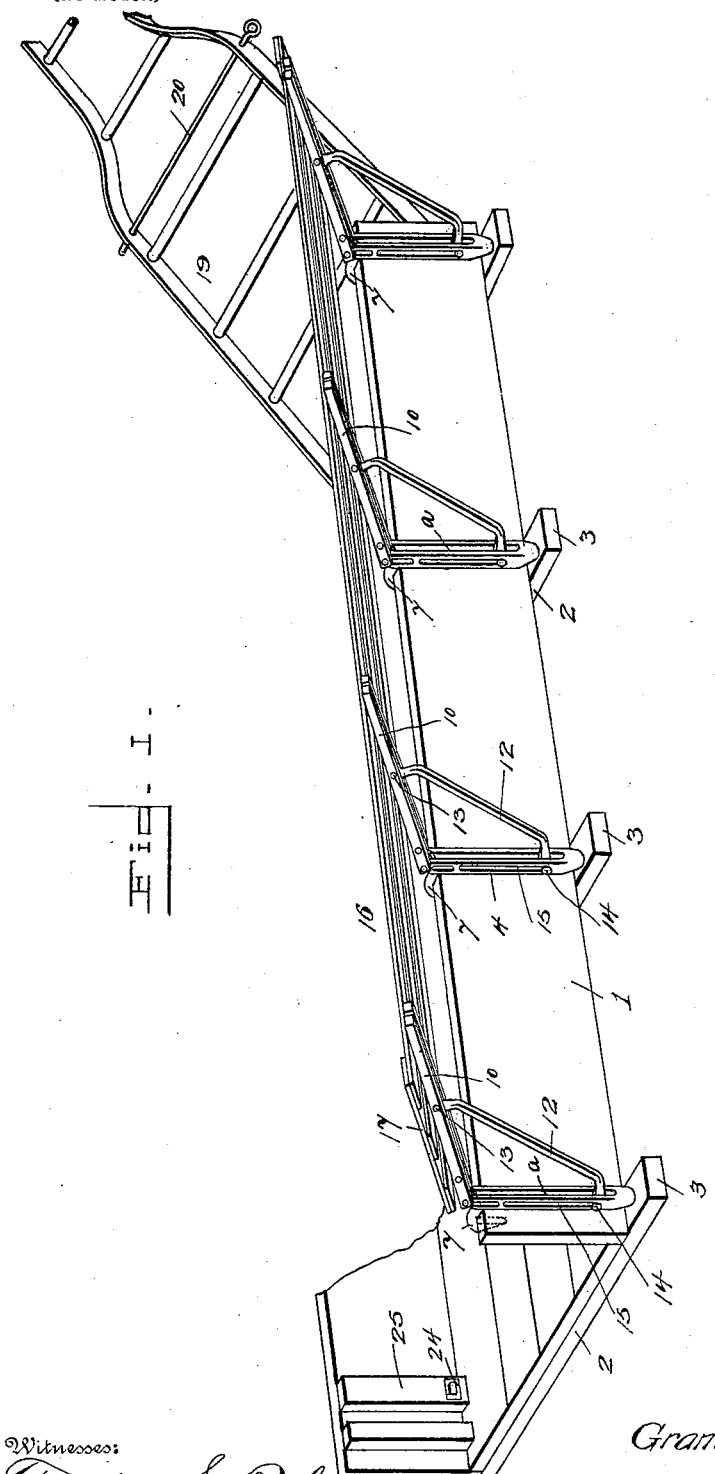

UNITED STATES PATENT OFFICE.

GRANT P. HOLMES, OF ALBION, MICHIGAN.

HAY AND STOCK RACK FOR VEHICLES.

SPECIFICATION forming part of Letters Patent No. 620,322, dated February 28, 1899.

Application filed July 19, 1898. Serial No. 686,330. (No model.)

*To all whom it may concern:*

Be it known that I, GRANT P. HOLMES, a citizen of the United States, residing at Albion, in the county of Calhoun and State of Michigan, have invented certain new and useful Improvements in Hay and Stock Racks for Vehicles; and I do declare the following to be a full, clear, and exact description of the invention, such as will enable others skilled in the art to which it appertains to make and use the same.

My invention relates to improvements in combined hay and stock racks for vehicles; and the object is to provide a simple, durable, and efficient device of this character whereby an ordinary farm-wagon may be converted at will into either a stock or hay wagon.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claim at the end of this specification.

The same reference characters indicate the same parts of the invention.

Figure 1 is a perspective view of the side of a wagon-box, showing my improved and combined hay and stock rack in position. Fig. 2 is a detail view of one of the rack-brackets. Fig. 3 is a similar view, partly in section, showing the device in use as a stock-rack. Fig. 4 is a detail view of the locking device.

1 denotes the side of the wagon-body, and 2 2 a series of parallel strips or bars fixed to the under side of the bottom, so as to leave the ends 3 3 projecting on each side of the wagon-body.

4 represents a malleable-iron standard having its threaded shank 5 secured in the projecting end 3 by a nut 6, and the upper end of said standard is formed with an integral jaw 7, which encompasses the upper end of the side-board 1.

8 represents a short lever fulcrumed in the upper end of the standard on the bolt 9, and 10 10 denote parallel bars having their inner ends bolted to said lever, as shown.

12 represents a diagonal bracket having its outer end pivoted between the bars 10 10 on the bolt 13 and its lower or inner end provided with a transverse bolt 14, which has a vertical movement in the guide-slots 15 in the lower end of the standard, while the lower end of the bracket 12 has a corresponding movement in the slot *a*, formed in the front face of said standard and between the slots 15.

16 16 represent the longitudinal parallel slats, connected at their outer ends by the cross-braces 17 17, and these slats are secured by bolts 18 18 to the parallel bars 10 10, as shown.

19 denotes the front ladder, which is pivoted to the forward end of the wagon-body, and 20 represents a transverse rod which passes through the top slats, forward cross-braces, and ladder to retain the parts in position when adjusted as a stock-rack.

21 denotes one of a pair of vertical bars, which are connected by transverse slats to form the end section, and 22 denotes a locking-bolt, one of which is fixed in the lower end of each of the bars 21, and the head of each bolt is formed with a lateral lug or jaw 23, extending parallel with said bar.

24 represents a keeper, one of which is fixed to the contiguous face of each of a pair of cleats 25, fixed to the inner faces of the sides 1 1. Each keeper 24 is provided with a horizontal oblong slot to receive the jaw 23 on the bolt 22. When the bar 21 is held in a horizontal position and after the bolt is inserted in this position, the end section is brought to a vertical position and secured by passing the rod 26 through the side slats 16 and bars 21.

The device is very simple and inexpensive, and a vehicle-body so arranged can be readily converted into a hay or stock wagon at will and in a very few minutes' time.

Having thus fully described my invention, what I claim as new and useful, and desire to secure by Letters Patent of the United States, is—

In combination, the standard 4 formed with the integral jaw 7 and provided with the alined slots 15 and the intermediate slot *a*, the lever 8 fulcrumed at its inner end in the upper end of said standard, the parallel bars 10 10 fixed to the free end of said lever, the diagonal bracket 12 pivoted at its upper end between said bars and having its lower end extending into the slot $a$ in the standard, and the bolt 14 extending through said lower end of said bracket and into the slots 15, substantially as shown and described.

In testimony whereof I have hereunto set my hand in presence of two subscribing witnesses.

GRANT P. HOLMES.

Witnesses:
LEVI S. WARREN,
LOUIS E. STEWART.